(12) United States Patent
Campbell et al.

(10) Patent No.: US 8,336,714 B2
(45) Date of Patent: Dec. 25, 2012

(54) HEATING SYSTEM FOR MATERIAL PROCESSING SCREEN

(75) Inventors: Dane Campbell, Eugene, OR (US); Steve Miller, Eugene, OR (US)

(73) Assignee: Emerging Acquistions, LLC, Eugene, OR (US)

( * ) Notice: Subject to any disclaimer, the term of this patent is extended or adjusted under 35 U.S.C. 154(b) by 53 days.

(21) Appl. No.: 12/466,322

(22) Filed: May 14, 2009

(65) Prior Publication Data
US 2010/0288680 A1  Nov. 18, 2010

(51) Int. Cl.
*B07B 13/00* (2006.01)

(52) U.S. Cl. .......................... 209/11; 209/667

(58) Field of Classification Search .............. 209/11, 209/238, 667, 671, 672, 673, 691, 707, 930
See application file for complete search history.

(56) References Cited

U.S. PATENT DOCUMENTS

| | | | |
|---|---|---|---|
| 530,262 A | 12/1894 | Distl et al. | |
| 785,508 A | 3/1905 | Mason | |
| 800,690 A | 10/1905 | McDonald | |
| 1,678,002 A * | 7/1928 | Duisenberg et al. | 241/66 |
| 1,679,593 A | 8/1928 | Williamson et al. | |
| 1,913,876 A | 6/1933 | Frederick | |
| 1,941,147 A | 12/1933 | Johlige | |
| 2,124,856 A | 7/1938 | Kohler | |
| 2,350,332 A | 6/1944 | Albaugh, Sr. | |
| 2,370,539 A | 2/1945 | Hodecker | |
| 2,417,921 A | 3/1947 | Fox | |
| 2,588,309 A | 3/1952 | Troyer | |
| 2,748,813 A | 5/1956 | Erickson | |
| 2,949,187 A | 8/1960 | Owens | |
| 3,013,662 A | 12/1961 | Phillips | |
| 3,062,414 A | 11/1962 | Morris | |
| 3,104,761 A * | 9/1963 | Roberson et al. | 209/667 |
| 3,143,492 A | 8/1964 | Bullock | |
| 3,249,225 A | 5/1966 | Stuetzer et al. | |
| 3,367,494 A | 2/1968 | Peterson | |
| 3,431,139 A | 3/1969 | Storszynski | |
| 3,477,566 A | 11/1969 | Autenrieth et al. | |
| 3,477,568 A | 11/1969 | Madrid | |
| 3,545,746 A | 12/1970 | Clayton et al. | |

(Continued)

FOREIGN PATENT DOCUMENTS

DE  592126  1/1934

(Continued)

OTHER PUBLICATIONS

Stolowitz Ford Cowger LLC, "Listing of Related Cases", Sep. 29, 2011, 1 page.

(Continued)

*Primary Examiner* — Joseph C Rodriguez
(74) *Attorney, Agent, or Firm* — Stolowitz Ford Cowger LLP

(57) ABSTRACT

A separation screen has multiple discs configured to receive a material stream at an in-feed end and move a first group of materials from the material stream up an inclined angle and over a top out-feed end of the separation screen while a second group of materials from the material steam either fall through openings between the discs while being carried up the separation screen or roll off the in-feed end of the separation screen. A heating system heats an outside surface of the discs so that the discs can separate the first group of materials from the material stream during cold environmental temperatures.

14 Claims, 8 Drawing Sheets

U.S. PATENT DOCUMENTS

| | | | |
|---|---|---|---|
| 3,599,788 A * | 8/1971 | Fyfe et al. | 209/11 |
| 3,643,797 A | 2/1972 | Berkowitz et al. | |
| 3,738,483 A | 6/1973 | MacKenzie | |
| 3,757,946 A | 9/1973 | Berkowitz et al. | |
| 3,788,568 A | 1/1974 | Marsh | |
| 3,831,748 A | 8/1974 | Berkowitz et al. | |
| 3,870,627 A | 3/1975 | Herkes | |
| 3,873,033 A | 3/1975 | Tilby | |
| 3,969,225 A | 7/1976 | Horowitz | |
| 4,087,177 A | 5/1978 | Gumm et al. | |
| 4,092,241 A | 5/1978 | Mackenzie et al. | |
| 4,155,602 A | 5/1979 | Quick | |
| 4,202,542 A | 5/1980 | Lammers et al. | |
| 4,301,930 A | 11/1981 | Smith | |
| 4,346,524 A * | 8/1982 | Wochnowski et al. | 34/482 |
| 4,352,731 A | 10/1982 | Moudgil et al. | |
| 4,377,401 A | 3/1983 | Laughlin | |
| 4,443,332 A * | 4/1984 | de Nevers | 209/331 |
| 4,466,605 A | 8/1984 | Leuthold et al. | |
| 4,538,734 A | 9/1985 | Gill | |
| 4,645,063 A | 2/1987 | Seragnoli | |
| 4,653,648 A | 3/1987 | Bielagus | |
| 4,685,569 A | 8/1987 | Osaki et al. | |
| 4,760,925 A | 8/1988 | Stehle et al. | |
| 4,789,068 A | 12/1988 | Gilmore | |
| 4,795,036 A | 1/1989 | Williams | |
| 4,798,508 A | 1/1989 | Lewis | |
| 4,836,388 A | 6/1989 | Bielagus | |
| 4,844,351 A | 7/1989 | Holloway | |
| 4,853,112 A | 8/1989 | Brown | |
| 4,871,073 A | 10/1989 | Bery et al. | |
| 4,892,647 A * | 1/1990 | Liddle et al. | 209/11 |
| 4,895,642 A | 1/1990 | Frei | |
| 4,901,864 A | 2/1990 | Daugherty | |
| 4,915,824 A | 4/1990 | Surtees | |
| 4,946,046 A | 8/1990 | Affleck et al. | |
| 5,024,335 A | 6/1991 | Lundell | |
| 5,025,929 A | 6/1991 | Carrera | |
| 5,032,255 A * | 7/1991 | Jauncey | 209/38 |
| 5,051,172 A | 9/1991 | Gilmore | |
| 5,060,806 A | 10/1991 | Savage | |
| 5,074,992 A | 12/1991 | Clinton | |
| 5,163,564 A | 11/1992 | Matula | |
| 5,232,097 A | 8/1993 | Tohkala | |
| 5,344,025 A | 9/1994 | Tyler et al. | |
| 5,361,909 A | 11/1994 | Gemmer | |
| 5,361,994 A | 11/1994 | Holloway | |
| 5,450,966 A | 9/1995 | Clark et al. | |
| 5,465,847 A | 11/1995 | Gilmore | |
| 5,480,034 A * | 1/1996 | Kobayashi | 209/667 |
| 5,484,247 A | 1/1996 | Clark et al. | |
| 5,485,925 A | 1/1996 | Miller et al. | |
| 5,506,123 A | 4/1996 | Chieffalo et al. | |
| 5,558,234 A | 9/1996 | Mobley | |
| 5,733,592 A | 3/1998 | Wettstein et al. | |
| 5,735,402 A | 4/1998 | Pezzoli et al. | |
| 5,799,801 A | 9/1998 | Clark et al. | |
| 5,901,856 A | 5/1999 | Brantley et al. | |
| 5,913,268 A | 6/1999 | Jackson et al. | |
| 5,957,306 A | 9/1999 | Hoffman | |
| 5,960,964 A | 10/1999 | Austin et al. | |
| 5,967,333 A | 10/1999 | Smith | |
| 6,003,681 A | 12/1999 | Wilbur et al. | |
| 6,006,888 A | 12/1999 | Winchester | |
| RE36,537 E | 2/2000 | Sommer, Jr. et al. | |
| 6,061,924 A * | 5/2000 | Bolton et al. | 34/134 |
| 6,076,684 A | 6/2000 | Bollegraaf | |
| 6,077,021 A | 6/2000 | Roman | |
| 6,079,929 A | 6/2000 | Muma et al. | |
| 6,089,814 A | 7/2000 | Bayer | |
| 6,110,242 A | 8/2000 | Young | |
| 6,144,004 A | 11/2000 | Doak | |
| 6,149,018 A | 11/2000 | Austin et al. | |
| 6,164,455 A * | 12/2000 | Kakita et al. | 209/11 |
| 6,250,472 B1 | 6/2001 | Grubbs et al. | |
| 6,253,924 B1 | 7/2001 | Bleifuss et al. | |
| 6,253,927 B1 | 7/2001 | Vaananen et al. | |
| 6,290,919 B1 | 9/2001 | Yokoyama et al. | |
| 6,365,857 B1 | 4/2002 | Maehata et al. | |
| 6,371,305 B1 | 4/2002 | Austin et al. | |
| 6,421,931 B1 * | 7/2002 | Chapman | 34/424 |
| 6,439,391 B1 * | 8/2002 | Seyffert | 209/238 |
| 6,719,119 B1 | 4/2004 | Hendzel et al. | |
| 6,726,028 B2 | 4/2004 | Visscher et al. | |
| 6,851,911 B2 | 2/2005 | Lhoest | |
| 6,903,294 B1 | 6/2005 | Daiku et al. | |
| 6,936,784 B2 | 8/2005 | Ogburn et al. | |
| 7,226,006 B2 * | 6/2007 | Porter et al. | 241/23 |
| 7,237,680 B2 | 7/2007 | Viny | |
| 7,473,407 B2 | 1/2009 | Phillip et al. | |
| 7,574,816 B2 * | 8/2009 | Shivvers | 34/333 |
| 7,584,856 B2 | 9/2009 | Miller et al. | |
| 7,591,375 B2 * | 9/2009 | Johnson | 209/11 |
| 7,677,397 B2 * | 3/2010 | Bjornson et al. | 209/672 |
| 7,810,646 B2 | 10/2010 | Miller et al. | |
| 7,921,628 B2 | 4/2011 | Meester | |
| 7,942,273 B2 | 5/2011 | Campbell et al. | |
| 8,065,815 B2 * | 11/2011 | Christy et al. | 34/381 |
| 2002/0148760 A1 * | 10/2002 | Don Brock et al. | 209/315 |
| 2003/0116486 A1 | 6/2003 | Davis | |
| 2004/0069693 A1 | 4/2004 | Paladin | |
| 2005/0092656 A1 | 5/2005 | Yan et al. | |
| 2006/0021915 A1 * | 2/2006 | Bjornson et al. | 208/424 |
| 2007/0045158 A1 * | 3/2007 | Johnson | 209/11 |
| 2007/0084757 A1 | 4/2007 | Jeon et al. | |
| 2008/0295356 A1 * | 12/2008 | Nickerson | 34/519 |
| 2010/0282647 A1 | 11/2010 | Miller et al. | |

FOREIGN PATENT DOCUMENTS

| | | |
|---|---|---|
| DE | 600232 | 6/1934 |
| DE | 609919 | 2/1935 |
| DE | 618154 | 8/1935 |
| DE | 640551 | 12/1937 |
| DE | 658699 | 3/1938 |
| DE | 1031220 | 5/1958 |
| DE | 3926451 | 3/1991 |
| DE | 4415069 | 11/1994 |
| EP | 0546442 | 6/1993 |
| EP | 0773070 | 5/1997 |
| FR | 2577448 A1 * | 8/1986 |
| SU | 1406093 | 6/1988 |
| WO | 2009079022 | 6/2009 |

OTHER PUBLICATIONS

International Search Report, PCT/US2008/054621, dated Sep. 16, 2008, 15 pages.

Nihot, Solutions in Air-Controlled Separation, The Nihot Windshifter, Catalog, 3 pages.

Nihot, Sort it Out With Air, The Nihot Drum Separators, Catalog, 8 pages.

* cited by examiner

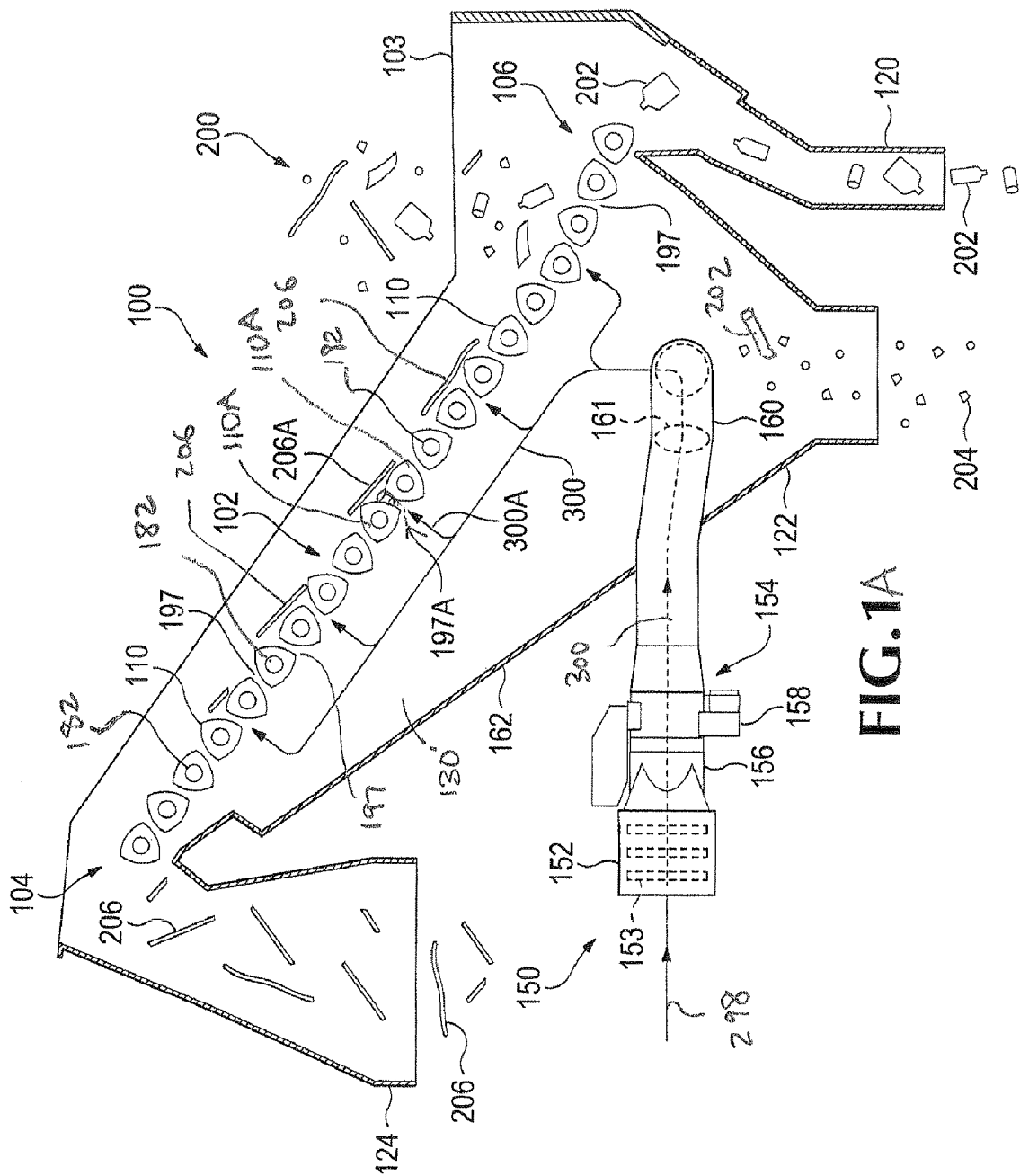

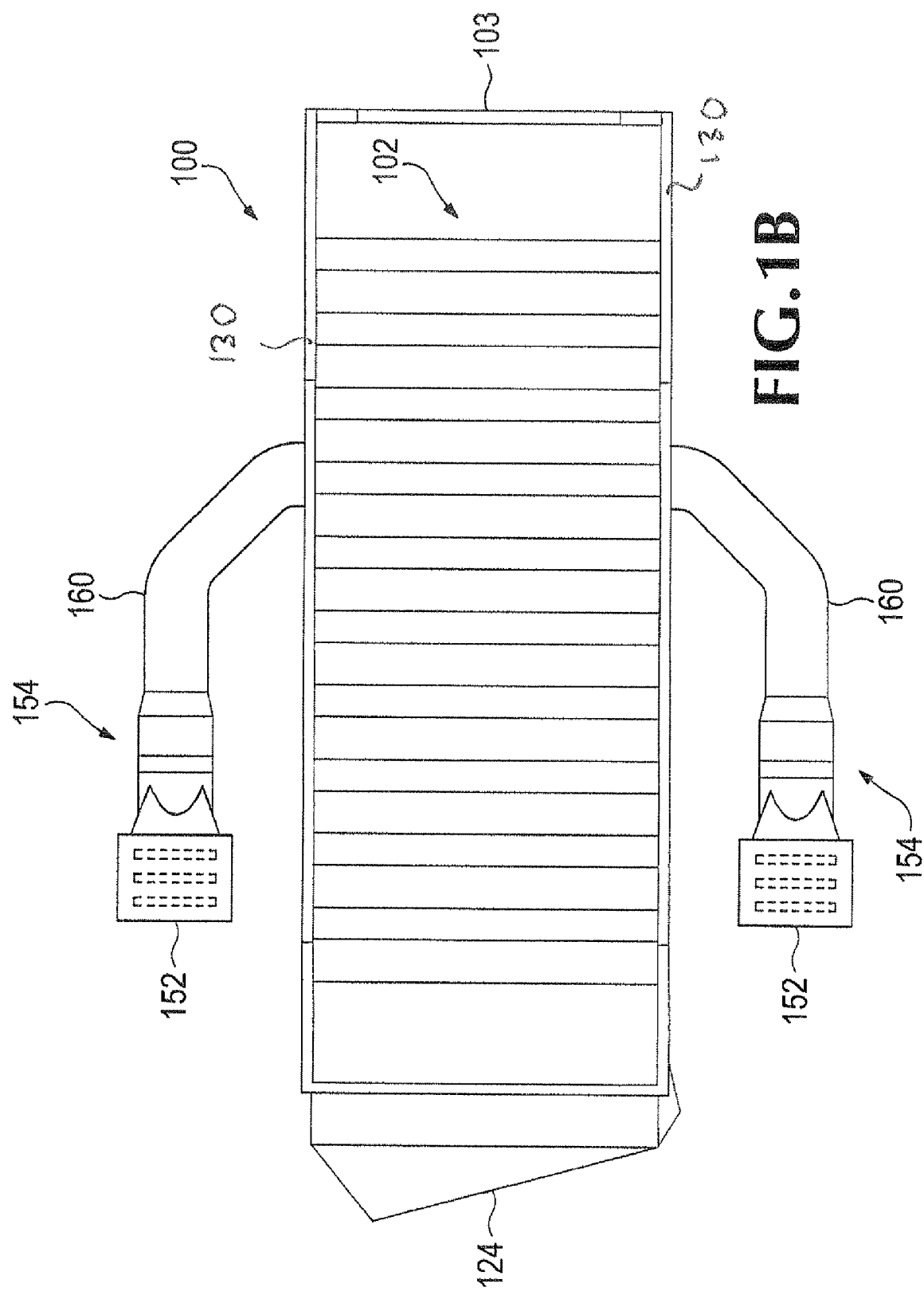

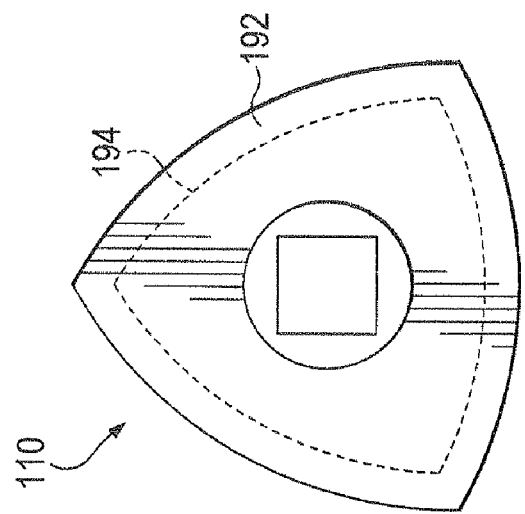
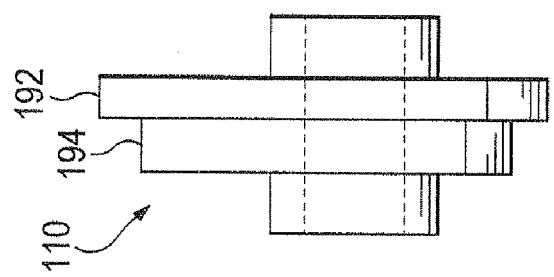
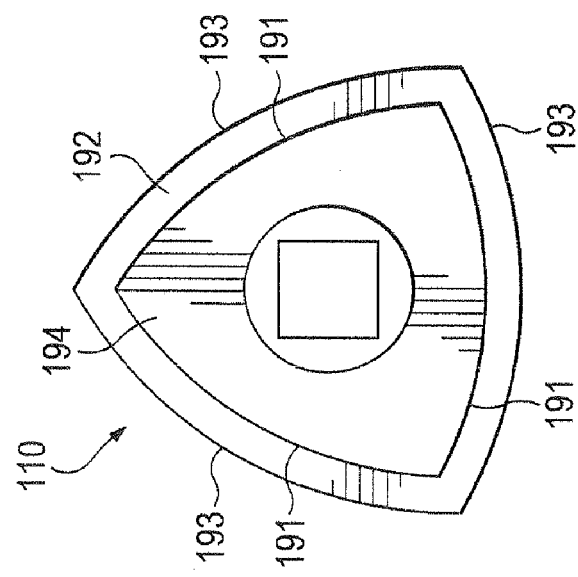
FIG. 6C
FIG. 6B
FIG. 6A

HEATING SYSTEM FOR MATERIAL PROCESSING SCREEN

FIELD OF THE INVENTION

This invention relates to screens for separating materials.

BACKGROUND

Disc screens are used in the materials handling industry for screening large flows of materials and removing certain items of desired dimensions. In particular, disc screens are used for classifying what is normally considered debris or residual materials. The debris may consist of soil, aggregate, asphalt, concrete, wood, biomass, ferrous and nonferrous metal, plastic, ceramic, paper, cardboard, or other products or materials recognized as debris throughout consumer, commercial and industrial markets.

In some applications, certain types of recyclable Municipal Solid Waste (MSW) are separated from other types of recyclable and/or non-recyclable waste. For example, paper, Old Corrugated Cardboard (OCC), and other fiber materials can be separated from plastic and metal containers. The discs in the screen are all driven to rotate in a common direction and are aligned at an inclined angle from an in-feed end of the screen bed to an out-feed or discharge end of the screen bed. The paper and cardboard is carried by the discs up the screen and over the out-feed end. The plastic and metal containers either roll down the back in-feed end of the disc screen or fall through InterFacial Openings (IFOs) as the containers are being carried up the disc screen.

BRIEF DESCRIPTION OF THE DRAWINGS

FIG. 1A is a side sectional view of a temperature controlled separation system.

FIG. 1B is a top plan view of the temperature controlled separation system shown in FIG. 1A.

FIGS. 6A-6C are more detailed views of the discs that may be used with the screen shown in FIG. 5.

DETAILED DESCRIPTION

Figure 2:
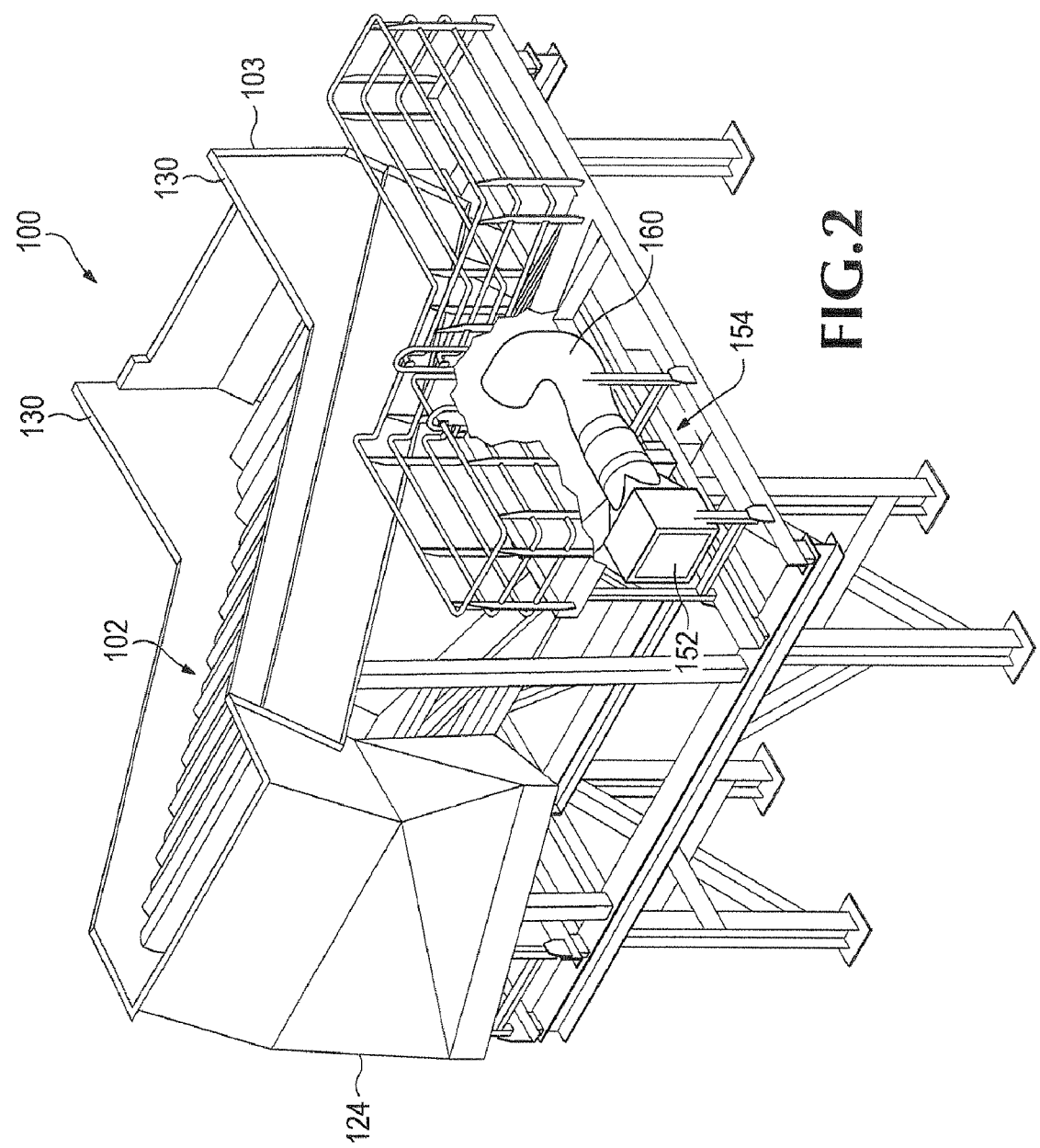
FIG. 2 is a perspective view of the temperature controlled separation system shown in FIG. 1.

Recyclable Municipal Solid Waste (MSW) materials include, but are not limited to, fiber material such as newspaper, mixed paper, Old Corrugated Cardboard (OCC), other cardboard and office paper products. Recyclable MSW can also include relatively light plastic containers, aluminum containers, tin containers and other containers or materials with two or three dimensional shapes. Some of the MSW can be used for making new products that may use the same material as the recycled items. For example, the paper and cardboard fiber material can be re-pulped to make new paper, cardboard or other fiber products. The recyclable MSW PolyEthylene Terephthalate (PET), High Density PolyEthylene (HDPE), PolyVinyl Chloride (PVC), or other plastic containers can be shredded and melted into new containers and other types of plastic products that may not be related to the original recovered product. For example, PET bottles can be used as fiber fill for winter jackets or as fill for mattresses. The recyclable MSW metal containers are separated out for the purpose of making new aluminum, tin, or steel products.

FIGS. 1A and 1B show a temperature controlled separation system 100 that efficiently separates recyclable fiber materials from recyclable plastic and metal containers during cold environmental conditions. The separation system 100 includes a frame 103 that supports a disc screen 102. The disc screen 102 includes shafts 182 that attach to the frame 103 and multiple discs 110 that attach to the shafts 182. The shafts 182 and discs 110 are rotated in unison by a motor (not shown). The disc screen 102 is orientated at an upwardly inclined angle from an in-feed end 106 to an out-feed end 104. A portion of the disc screen 102 is shown in more detail below in FIGS. 5 and 6.

The disc screen 102 sorts recyclable items from a comingled Material Solid Waste (MSW) stream 200. Smaller objects and residue 204 typically falls through InterFacial Openings (IFOs) 197 formed between the discs 110. The objects and residue 204 drop through the screen 102 and into a central chute 122. Other flatter and larger fiber material 206, such as paper and OCC, are transported by the discs 110 over the top out-feed end 104 of disc screen 102 and dropped into a chute 124. Containers and other more three dimensional objects 202, such as plastic and metal bottles, cans, jugs, other containers, etc. either fall through the IFOs 197 in the disc screen 102 and into chute 122 or tumble backwards off the back in-feed end 106 of the screen 102 into a chute 120.

The discs 110 can either be made of a metal material, or a polymer or rubber material. In some applications, rubber discs 110 can be more efficient at separating the fiber materials 206 from the containers 206 and other smaller objects 202. The rubber discs 110 provide better gripping of the relatively flat more two dimensional paper and OCC 206 and therefore are more efficient at pulling and carrying the fiber 206 up and over the out-feed end 104 of the screen 102.

However, cold temperatures can cause the rubber discs 110 to become substantially harder reducing the gripping or tackiness of the disc surface. This prevents the rubber discs 110 from grabbing and carrying as much of the fiber materials 206 up the screen 102. During these cold conditions, some of the fiber material 206 slips off of the discs 110 and undesirably either accumulates at the in-feed end 106 of screen 102 or falls back over the in-feed end 106 of screen 102 into chute 120. Thus, in cold temperatures the separation system 100 becomes much less efficient in separating fiber materials 206 from the other MSW materials 202 and 204.

Heating System

A heating system 150 maintains the surface of the rubber discs 110 at a relatively warm temperature to improve material separation efficiency of the separation system 100 when operating in cold environmental conditions. The heating system 150 can also promote drying of wet materials in the MSW stream 200 while the material is being carried up disc screen 102. Heat from the heating system 150 can also be recycled to improve the overall energy efficiency of the separation system 100.

Referring to FIGS. 1A, 1B, and 2, the heating system 150 includes a forced air heater 154 that includes an air blower motor 156 that that blows air through electric heating coils 158 and into a heat duct 160. In one example, the heat duct 160 has a 16 inch diameter, but of course, other heat duct sizes and types could also be used.

The heat duct 160 extends from the heater 154 into a bottom side of the central chute 122 that is located underneath the disc screen 102. As explained above, the central chute 122 is used for collecting the "fines" that fall between the IFO gaps 197 formed in-between discs 110. In the embodiment shown in FIGS. 1A, 1B, and 2, two separate forced air heaters 154, and two separate heat ducts 160, blow hot air into opposite sides of the central chute 122. To prevent materials 204 from falling back into heat ducts 160, a grill (not shown) can be placed at the outlets where the heat ducts 160 connect into the central chute 122. Valves 161 can be located inside of heat ducts 160 and can be closed whenever the heating system 150 is turned off. For example, a control system (not shown) that includes a Programmable Logic Controller (PLC) and a motor may be used to automatically close the valve 161 whenever heating system 150 is turned off. Alternatively, the valve 161 may be manually closed.

The air blower motor 156 pulls ambient air 298 through an air intake 152 and into the heater 156. The air intake 152 can retain one or more envelope filters 153 that filter the ambient air 298 prior to being blown into heater 158. The blower 156 blows the heated air 300 from heater 158 through heat duct 160 and into the central chute 122. The heated air 300 exits the heat duct 160 and permeates up through the disc screen 102, heating the surface of rubber discs 110.

Some of the heated air 300 rises up through the openings (IFO's) 197 that are formed between the discs 110 on adjacent shafts 182. However, when the separation system 100 is in operation, many of these openings 197 are covered for periods of time by the materials 200 that are being carried up screen 102. For example, paper or cardboard 206A temporarily covers up opening 197A and temporarily holds heated air 300A between adjacent discs 110A.

Material 206A effectively operates as a roof that temporarily retains heat 300A, that would have normally escaped up through screen 102, in-between adjacent discs 110A. This temporary heat capture further increases the surface temperature of the discs 110A, and reduces the amount of energy needed to heat up the discs 110 to a desired temperature. This trapping of heat 300A also further dries out the trapping material 206A as it is being carried up disc screen 102.

The central chute 122 has a bottom inclined wall 162 that extends underneath substantially the entire length of the disc screen 102. Opposite side walls 130 of the central chute 133 also extend along substantially the entire length of the disc screen 102. The bottom wall 162 and side walls 130 also operate as a heat chamber underneath substantially the entire disc screen 102 that helps direct the heated air 300 diagonally upward along the length of disc screen 102 from the in-feed end 106 to the out-feed end 104. Thus, substantially the entire disc screen 102 and substantially all of the discs 110 receive portions of the heated air 300 output from heat duct 160.

In one embodiment, the heated air 300 comes out of the heat ducts 160 at a relatively slow airflow speed of between 800 Cubic Feet per Minute (CFM) and 1600 CFM. This prevents the heated air flow 300 from lifting the materials 200 off the screen 200.

The surfaces of the rubber discs 110 become softer as they are exposed to the heated air 300 resulting in increased gripping characteristics. This allows the rubber discs 110 to more effectively pull fiber materials 206, such as paper and OCC, from the in-feed end 106 of screen 102, and carry the fiber materials 206 up screen 102 and over out-feed end 104. The containers and other plastic and metal objects 202, however, continue to roll backwards off the in-feed end 106 of screen 102 into chute 120. Thus, the heating system 150 improves the efficiency of the separation system 100 when operating in cold temperatures.

The temperature may be different at different locations along the length of, for example, a 26 foot long disc screen 102. The average temperature toward the out-feed end 104 of screen 102 may also be higher than the average temperature at the in-feed end 106 of screen 102.

However, testing has shown that maintaining the surface of the rubber discs 110 generally above 40 degrees Fahrenheit provides substantial improvement in the ability of the rubber discs 110 to transport the fiber materials 206 up screen 102. Testing has also discovered that maintaining a temperature of between 60-80 degrees Fahrenheit, or higher, on the surface of the rubber discs 110 provides improved material separation efficiency. A forced air heater 154 producing between 50,000-100,000 British Thermal Units (BTUs) provides sufficient heat to obtain desired temperatures on the outside surfaces of the discs 110. Of course, the size of heater 154 could vary depending on the temperature conditions where the separation system 100 is located.

Different disc surface temperatures may also provide different separation characteristics based on the speed of the discs 110, the type of rubber used in the discs 110, and the incline angle of screen 102. In some embodiments, only one heat duct 160 may be used, and in other embodiments, more than one heat duct 160 may used and attached to multiple different locations on each side of the center chute 122.

It is particularly desirable to control the surface temperature of the discs 110 to ensure the discs 110 provide adequate gripping characteristics. Heating other areas around the screen 102 is not as directly responsible for increasing separation performance. Thus, less heat energy would be required to heat the discs when the heat is directed primarily at the discs 1107 and not directed around other non-essential areas of the screen 102.

As explained above, locating the heat ducts 160 at the bottom of chute 122 allow most of the heated air 300 to rise diagonally upward underneath screen 102. The central chute 122 retains and directs substantially all of this heated air 300 upwards directly into the rubber discs 110. Thus, the heating system 150 is efficient at heating the surfaces of discs 110.

A thermostat and a programmable logic controller (not shown) can be used to automatically turn on the heating system 150 when the ambient temperature falls below some programmable temperature level. However, in other embodiments, the heating system 150 is turned on manually or automatically based on a timer and then kept on for some programmable period of time. For example, the heater system 150 can be programmed to start 30 minutes before a shift, and stay on for different amounts of time each day depending on the time of year. For example, during the coldest winter months, the heater system 150 can be programmed to stay on all day, and during the fall and spring months, the heater system 150 may be programmed to only stay on during morning hours.

The heater system 150 can be easily wired into an existing electrical system used by separation system 100 and can be controlled either manually or through system control and a Programmable Logic Controller (PLC). The filters 153 are optional, but when used, reduce the chance of materials entering the blower 156 and heating unit 158. The filters 153 are accessible for maintenance and easily changed. The heat ducts 160 can be flexible to allow the angle of the screen 102 to be adjusted.

Figure 3A:
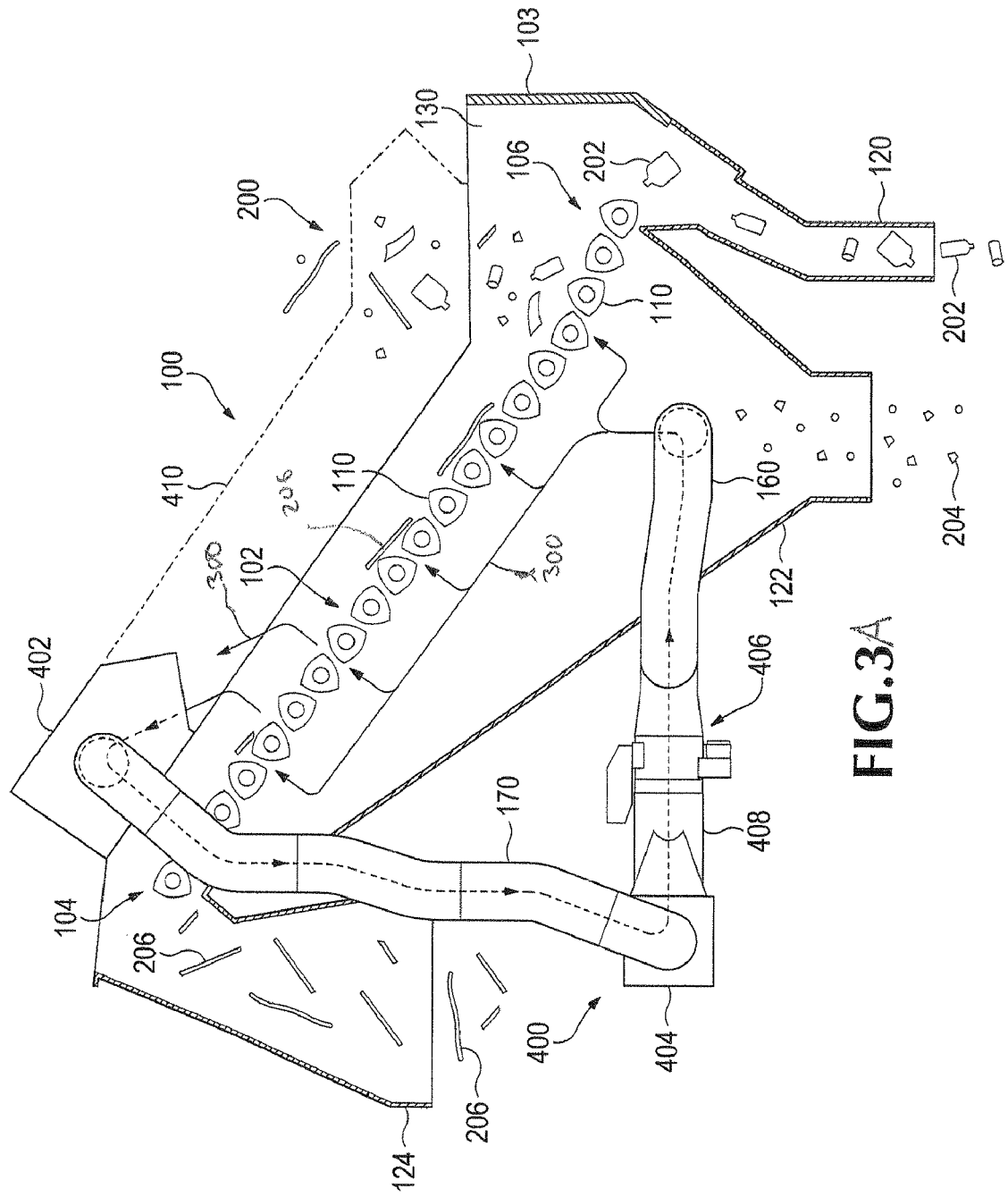
FIG. 3A is a side sectional view of an alternative embodiment of the temperature controlled separation system.
Figure 3B:
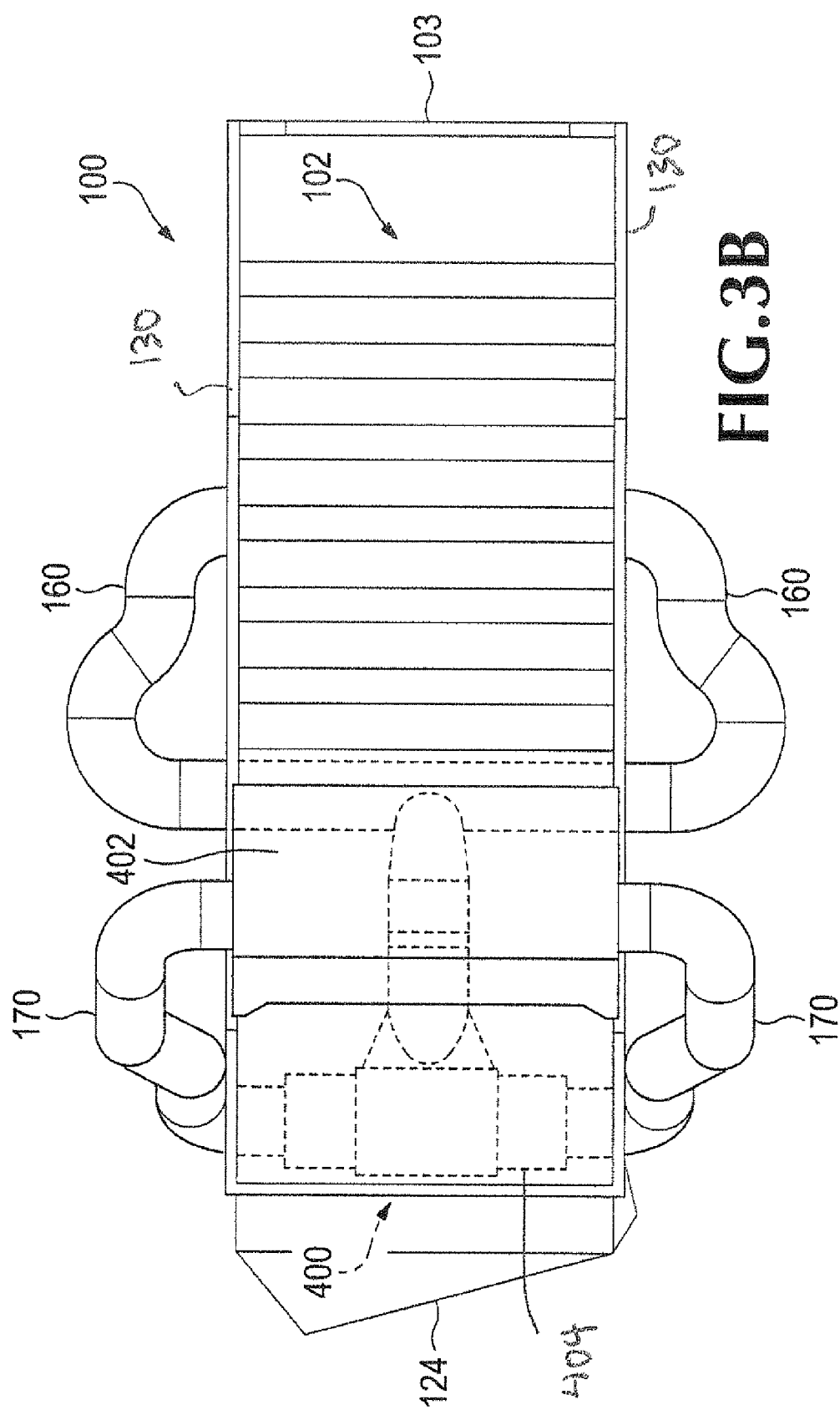
FIG. 3B is a top plan view of the temperature controlled separation system shown in FIG. 3A.
Figure 4:
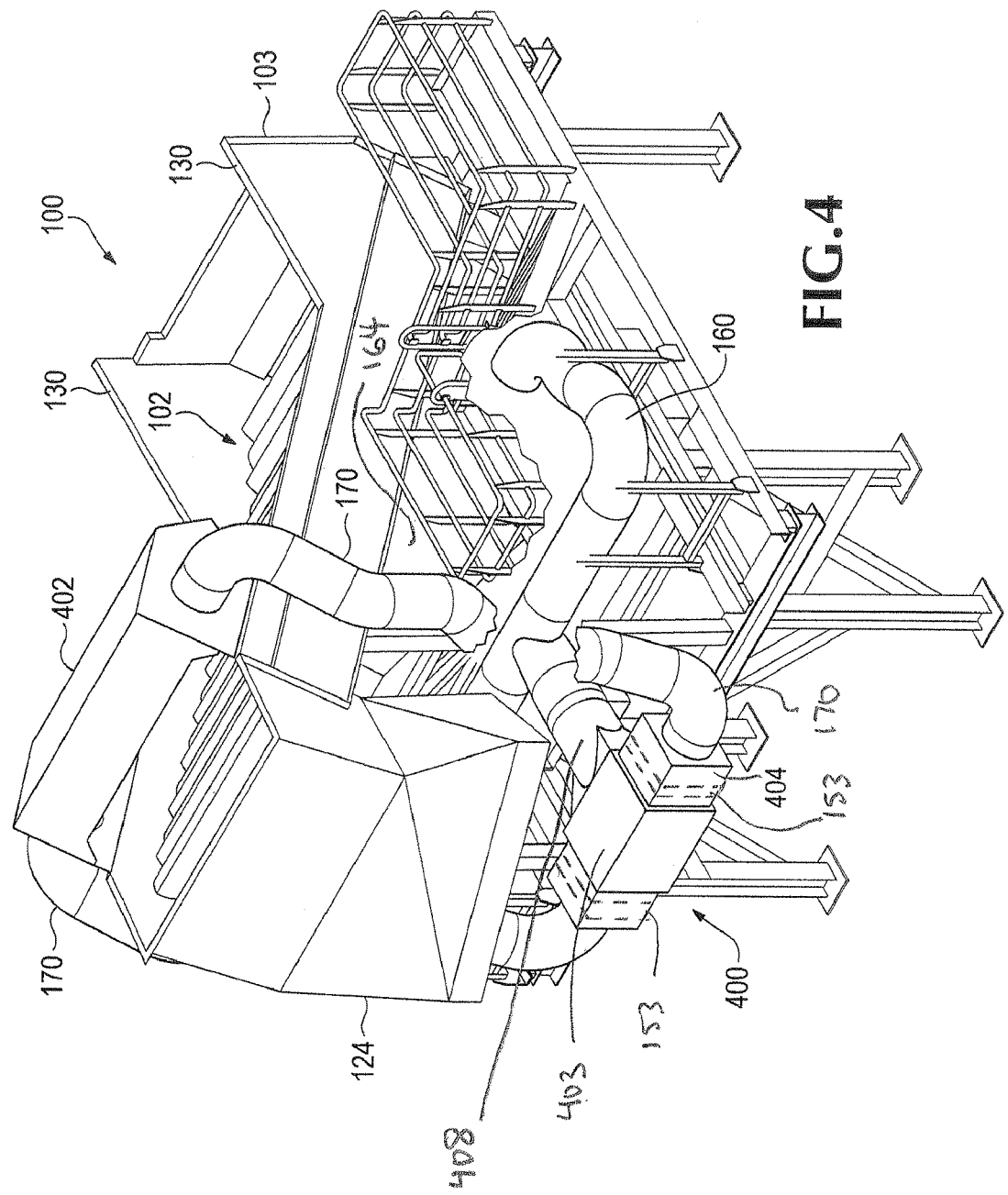
FIG. 4 is a perspective view of the temperature controlled separation system shown in FIGS. 3A and 3B.

The heating system 150 can use multiple smaller forced air heating units 154 as shown in FIGS. 1A, 1B, and 2, or can use one larger forced air heater unit 406 as shown in FIGS. 3A, 3B, and 4. The decision on the number of separate heating units to use may be based on the support structure used for supporting the disc screen 102 and associated equipment. Other considerations, such as cost, wiring runs, duct lengths, and filter maintenance location etc., may also determine the number and type of heating units used with the particular separation system 100.

The heating unit 154 can be manufactured with an enclosure that can be washed down with a hose. The inside surfaces of the heating unit 154 can include a ceramic coating that prevents metal material that may pass through the heating system 154 from creating sparks and for washdown anti-corrosion. One type of forced air heater 154 that could be used is a Marley forced air heater model W1250483CTLS, 12.5 kW, 42 k BTU, 1180 CFM, 480 VOLT. In another embodiment, a gas heater could be used instead of the electric heater 158.

Reclamation Hood

FIGS. 3A, 3B, and 4 show another screen heating system 400 that includes an optional heat reclamation hood 402. The hood 402 mounts directly to the top of side walls 130 of frame 103 above the out-feed end 104 of the disc screen 102. Ducts 170 fluidly couple opposite sides of reclamation hood 402 to an air intakes 404 for a forced air heater 406. In this embodiment, a single forced air heater 406 is connected at air intake 404 to the two air ducts 170 and is coupled at the output of heater 406 to the two heat ducts 160 that connect to opposite sides of the center chute 122.

A blower 408 creates a negative air flow in ducts 170 that pull the heated air 300 that permeates up through the disc screen 102 into reclamation hood 402. The heated air 300 is pulled through hood 402 and the two ducts 170 into air intake 404. The air 300 is then reheated by the forced air heater 406 and blown back out through the two heating ducts 160 into the center chute 122. The recycled heated air 300 then again rises diagonally up in the center chute 122 reheating the surfaces of discs 110. The heat reclamation hood 402 provides more efficient disc heating by reclaiming the heated air 300 that rises up through screen 102.

Some material separation systems 100 are less efficient at separating material in high humidity environments or when the material stream 200 is wet. The reclamation hood 402 can be coupled to a dehumidifier 403 located in air intake 404 to further dry out the recycled heated air 300 and further improve separation efficiency in high humidity environments.

Dust can also be created as the material stream 200 is dropped onto the separation system 100 and as the material stream 200 is agitated and carried up the disc screen 102. The heating system 400 can also provide dust suppression by pulling some of the dust through recycling hood 402 into the ducts 170. Filters 153 in the air intake 404 then remove the dust from the recycled air 300.

Drying Screen

In another embodiment, a reclamation hood 410 (shown in dashed lines) extends along and above substantially the entire length of disc screen 102 on top of frame sidewalls 130. The longer reclamation hood 410 draws more of the heated air 300 increasing air circulation around material stream 200. The dehumidifier 403 in air intake 404 then removes the water in the reclaimed heated air 300. This additional drying can increase the quality of the recovered fiber material 206 while at the same time separating the fiber material 206 from the other objects 202 and 204 in material stream 200.

To further material drying, the forced air heater 406 can also generate hotter air 300 and/or increase the heated air flow. A heated air flow of around 5000 CFM substantially increases the drying effect of separation system 100 on the material stream 200.

In some applications the fiber material 206 may be used for burning. The drier fiber materials 206 provided by the hotter air and increased air circulation can result in more efficient burnable pellet extrusion. In other embodiments, the separation system 100 may not even be used for separating material 200, and in other applications, only used for drying out burnable materials. The separation system 100 can dry more material, in a smaller amount of space, and at less cost than some existing material drying systems.

In yet another embodiment, infrared heaters (not shown) apply heat directly onto the discs 110 on screen 102. Multiple infrared heaters are supported above the screen 102 by metal bars that are attached to the side walls 130 of frame 103. The infrared heaters are placed at spaced apart locations along and above the entire length of screen 102. Infrared heating can be enhanced by adding ingredients to the rubber discs 110 that absorb more of the infrared heat. For example, metal flakes may be impregnated within the rubber discs 110 during disc manufacturing. The metal flakes absorb, retain, and radiate more of the emitted infrared heat keeping the surface of the discs 110 warmer. The infrared heaters heat the discs 110 prior to the material stream 200 being loaded onto screen 102. The infrared heaters can then be kept on while separation system 100 is operating to warm a top layer of material 200 and the underlying discs 100.

Figure 5:
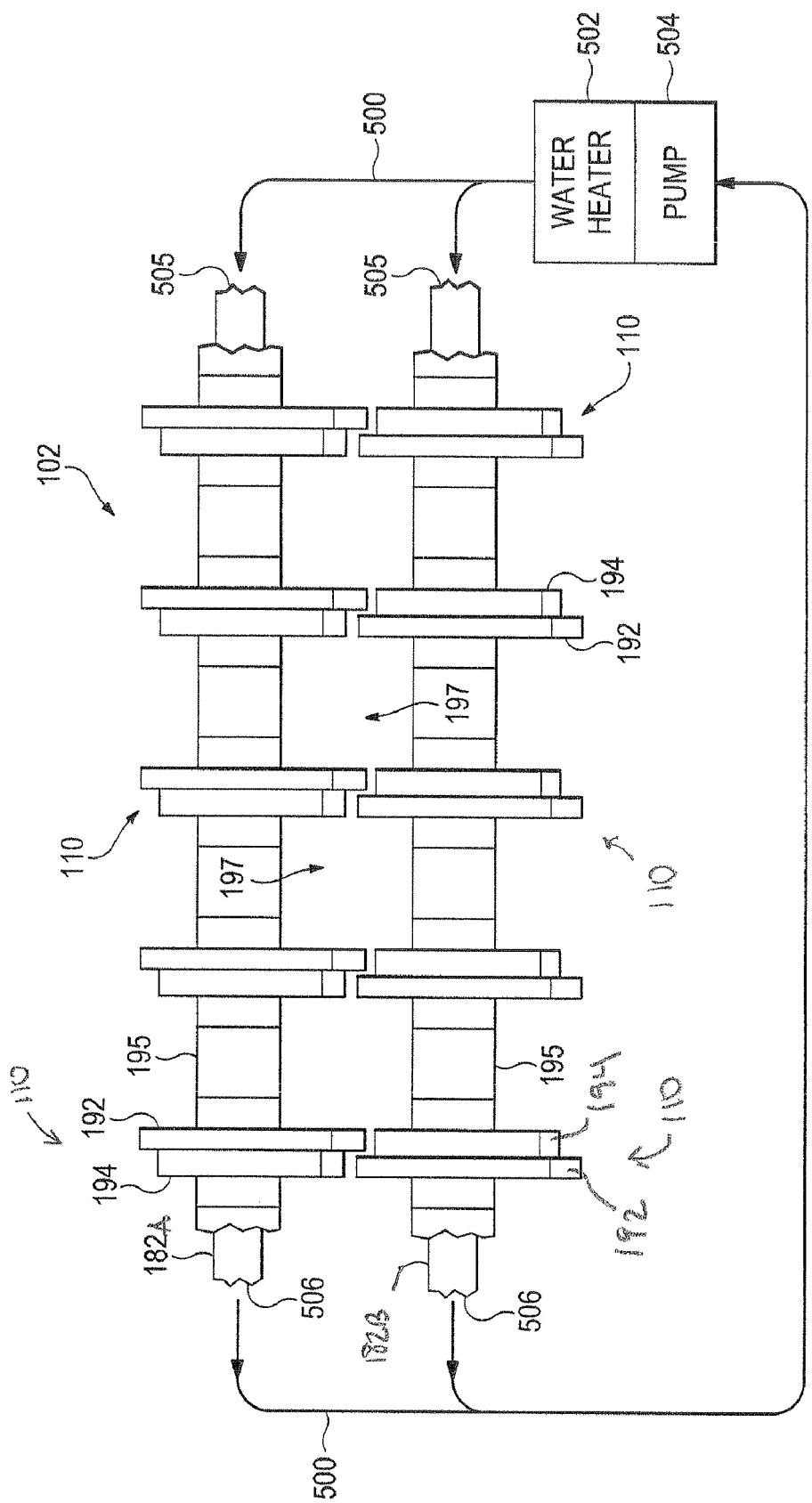
FIG. 5 is an isolated view of one type of screen that can be used in the temperature controlled separation systems shown in FIGS. 1-4.

FIG. 5 shows a portion of the disc screen 102 previously shown in FIGS. 1-4. The disc screen 102 includes a first shaft 182A and a second shaft 182B mounted to the sidewalls 130 of frame 103 (FIGS. 1-4) in a substantially parallel relationship. A primary disc 192 and associated secondary discs 194 are referred to generally as compound disc 110 and in one embodiment are formed from the same or two different pieces of rubber. The compound discs 110 mounted on the first shaft 182A are separated by spacers 195.

A second set of primary discs 192 are mounted on the second shaft 182B in lateral alignment with secondary discs 194 on the first shaft 182A. Secondary discs 194 are mounted on the second shaft 182B and are aligned laterally with the primary discs 192 on the first shaft 182A. The primary discs 192 and associated secondary discs 194 mounted on the second shaft 182B are also referred to generally as compound discs 110 are also separated from other compound discs 110 on shaft 182B by spacers 195.

The primary discs 192 on the first shaft 182A and the secondary discs 194 on the second shaft 182B maintain a substantially constant spacing during rotation. The secondary discs 194 on the first shaft 182A and the primary discs 192 on the second shaft 182B also maintain a substantially constant perimeter spacing during rotation.

The alternating alignment of the primary discs 192 with the secondary discs 194 both laterally across each shaft 182 and longitudinally between adjacent shafts 182 eliminate rectangular shaped secondary slots that would normally extend laterally across the entire width of the disc screen 102 between discs on adjacent shafts. Large thin materials, such as paper and cardboard, do not pass through these secondary slots. These materials can then be carried along the disc screen 102 and deposited in chute 124 with other recyclable MSW fiber materials. The smaller materials 204 described above in FIG. 1A fall through these IFOs 197. The heating system 150 or 400 described above improves the ability of these compound discs 110 to carry fiber material up screen 102 at cold temperatures.

In one embodiment, openings 197 are 2 inches×2 inches but different dimensions may also be used in different applications. For example, the size of openings 197 can vary according to the market for the fines material 204 (FIG. 1A) which can differ according to region. In other types of news sorter screens, the openings 197 may be larger, such as 3.25, 4.25, or 5.25 inches×5 inches.

One type of news sorter screen is described in U.S. Pat. No. 5,960,964 which is incorporated by reference in its entirety. Any of the materials that fall off the back of this news-sorter screen may then be dropped onto the disc screen 102 described above. Both the news sorter screen, and the disc screen 102 described above in FIGS. 1-4, may use any of the heating systems described above.

In an alternative embodiment, the shafts 182A and 182B are hollow. A fluid 500, such as water, is heated by a water heater 502 and pumped by pump 504 through the hollow shafts 182A and 182B. The water 500 transfers heat into a first end 505 of the shafts 182A and 182B that then radiates outward to the discs 110. The pump 504 also sucks the fluid 500 back out an opposite end 506 of the shafts 182 and then recycles the previously heated water 500 back through the water heater 502 and back into the hollow shafts 182A and 182B.

The combination of the water heater 502, pump 504, and hollow metal shafts 182A and 182B operate similarly to a radiator. Heat is radiated externally from the outside surface of the metal shafts 182A and 182B, in turn, heating the outside surface of the attached compound discs 110. The discs 110 remain relatively warm in cold external conditions thus maintaining efficient separation of the MSW material stream 200 (FIG. 1A).

FIGS. 6A-6C show the compound discs 110 from FIG. 5 in more detail. The primary discs 192 have three arched sides 193. The secondary discs 194 extend from a side face of the primary discs 192 and also have three arched sides 191. The outside perimeter of the secondary discs 194, are smaller than the outside perimeter of the primary discs 192. In one embodiment, the secondary discs 194 are approximately twice as wide as the width of primary discs 192.

The primary disc 192 and the associated secondary disc 194 can be formed from the same piece of rubber. However, the primary discs 192 and associated secondary discs 194 can also be formed from separate pieces of rubber. The compound discs 110 are described in U.S. Pat. No. 5,960,964, which is herein incorporated by reference in its entirety.

As described above, the rubber disc material grips onto certain types and shapes of fiber materials 206 providing a more effective screening process. Heating the rubber compound discs 110 with heating system 150 or 400, as described above, maintains high separation efficiency during cold temperatures.

The compound discs 110 are shown as having a triangular profile with arched sides. However, the discs used in the disc screen 102 do not have to be dual diameter discs, and could alternatively be single diameter discs with any number of sides and any shape, such as four sides or five sides. In other embodiments, the screen 102 does not use discs, and alternatively uses multiple fingers, teeth, etc. that extend out from rotating shafts. The heating system can be used with any other material separation system that needs to carry material up a separation screen.

In yet other embodiments, the discs 110 can be made out of other polymer materials or are made out of metal materials, such as steel. In these embodiments, the primary and secondary discs may be formed from a unitary piece of metal or polymer or formed from separate pieces of metal or polymer.

The heated separation system 100 can also be used in combination with other screening and separation systems, such as the air separation system or electrostatic separation system described in pending U.S. patent application Ser. No. 11/959,361 filed Dec. 12, 2007 which is also herein incorporated by reference in its entirety.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

What is claimed is:

1. A separation system comprising:
    a separation screen having multiple discs configured to receive a material stream comprising a first group of materials and a second group of materials, wherein the discs are configured to move the first group of materials over an out-feed end of the separation screen, and wherein the discs are further configured to cause the second group of materials to either fall through openings between the discs or roll off an in-feed end of the separation screen;
    a center chute located underneath the disc screen;
    a forced air heater configured to generate a heated air flow;
    one or more air ducts configured to direct the heated air flow into the center chute, wherein the one or more air ducts includes two heat ducts coupled on opposite sides of the center chute;
    a reclamation hood that extends diagonally above a majority of the length of the separation screen and is configured to draw in at least some of the heated air flow that passes through the openings; and
    a return air duct configured to direct the heated air flow from the reclamation hood back to the forced air heater.

2. The separation system according to claim 1 wherein the separation screen is positioned at an inclined angle, wherein the discs are configured to move the first group of materials up the inclined angle, and wherein the heated air flow is directed underneath the separation screen and moves diagonally upward from underneath the separation screen along a length of the separation screen.

3. The separation system according to claim 2 wherein at least some of the material stream is configured to cover some of the openings between the discs while being carried up the separation screen and trap at least some of the heated air flow between at least some of the discs.

4. The separation screen according to claim 1 wherein the center chute is configured to collect at least some of the second group of materials that fall through the discs.

5. The separation screen according to claim 1 wherein the reclamation hood extends diagonally above substantially the entire length of the separation screen.

6. The separation screen according to claim 5, further comprising a dehumidifier configured to remove moisture from the heated air drawn into the reclamation hood.

7. The separation screen according to claim 1 wherein the material stream is received at the in-feed end, wherein the separation screen is positioned at an inclined angle, wherein the first group of materials is moved up the inclined angle and over the out-feed end, wherein the second group of materials fall through the openings while being carried up the inclined angle, and wherein the heated air flow is directed to an outside surface of the discs so that the outside surface of the discs stay warm during cold environmental temperatures.

8. A method for operating a disc screen, comprising:
dropping a material stream onto the disc screen, wherein the disc screen includes rotating discs;
directing, by a heating system, a heated air flow from a center chute located underneath the disc screen toward the discs while the material stream moves along the disc screen, wherein the heated air flow is provided to the center chute by two heat ducts coupled on opposite sides of the center chute, wherein a first portion of the material stream is transferred over an end of the disc screen, and wherein a second portion of the material stream falls through openings formed between the discs before reaching the end of the disc screen;
reclaiming, by a hooded intake that extends diagonally above a majority of the length of the separation screen, at least some of the heated air flow that passes through the openings; and
directing the reclaimed heated air flow from the hooded intake back to the heating system.

9. The method according to claim 8 further comprising heating the discs by blowing heated air upward underneath the disc screen.

10. The method according to claim 9 further comprising:
reheating the reclaimed heated air flow; and
directing the reheated air back up underneath the separation screen.

11. The method according to claim 8 wherein the heated air flow is directed diagonally upward from the center chute along a length of the disc screen.

12. The method according to claim 8 wherein the discs are made out of rubber; and wherein the method further comprises heating an outside surface of the rubber discs to a temperature of between 60 and 80 degrees Fahrenheit.

13. The method according to claim 8 wherein the first portion of the material stream includes fiber materials that have a relatively thin and flat shape, and wherein the heated air is directed onto the discs during relatively cold environmental conditions to improve a separation efficiency of the first portion of the material stream from the second portion.

14. The method according to claim 8 wherein the reclamation hood extends diagonally above substantially the entire length of the separation screen.

* * * * *